United States Patent [19]

Miyano

[11] Patent Number: 5,672,016
[45] Date of Patent: Sep. 30, 1997

[54] METHOD FOR CONTROLLING COLOR IMAGE DATA

[75] Inventor: Tsuyoshi Miyano, Iwate-ken, Japan

[73] Assignee: Alps Electric Co., Ltd., Tokyo, Japan

[21] Appl. No.: 575,564

[22] Filed: Dec. 20, 1995

[30] Foreign Application Priority Data

Dec. 28, 1994 [JP] Japan .................... 6-329067

[51] Int. Cl.$^6$ .................................................. B41J 2/21
[52] U.S. Cl. .................... 400/120.02; 347/43; 395/115
[58] Field of Search ................... 400/120.02, 120.03, 400/120.04, 68; 347/43, 172, 173; 395/108, 109, 115, 116

[56] References Cited

U.S. PATENT DOCUMENTS

| | | | |
|---|---|---|---|
| 4,985,850 | 1/1991 | Okamoto | 395/109 |
| 5,285,296 | 2/1994 | Komooka | 395/109 |
| 5,450,532 | 9/1995 | Bockman | 347/43 |

FOREIGN PATENT DOCUMENTS 222762  10/1986  Japan ................. 400/120.02

*Primary Examiner*—Edgar S. Burr
*Assistant Examiner*—Steven S. Kelley
*Attorney, Agent, or Firm*—Guy W. Shoup; Patrick T. Bever

[57] ABSTRACT

A color-image data control method for storing color image data inputted from an external device in a memory provided in a printer, for reading the color image data stored in this memory and for printing the read color image data by use of a print head, wherein the color image data is data obtained by performing a raster scan on each color component of the color image data according to the arrangement of the printing elements of the print head, wherein the memory provided in the printer has capacity sufficient to store all color components of color image data to be printed by use of all printing elements of the print head, wherein image data corresponding to each color component is read from the memory provided in the printer as a unit to be printed by all of the printing elements of the print head and is used to print one of the color components of an image, wherein color image data respectively sent from the external device are serially stored in spaces of the memory provided in the printer color, which are released by reading the image data respectively corresponding to color components. Thereby, the capacity of the memory can be reduced by half in comparison with that of the memories of a system employing a conventional method, and a high-speed printing can be realized by performing a multitasking operation.

3 Claims, 2 Drawing Sheets

METHOD FOR CONTROLLING COLOR IMAGE DATA

BACKGROUND OF THE INVENTION

1. Field of the Invention

The present invention relates to a color-image-data control method for controlling color image data of the row raster data type by utilizing a memory contained in a serial printer when the printer prints the image data.

2. Description of the Related Art

Generally, printers such as a serial printer and a page printer receive printing data sent from an external device such as a computer and perform a printing operation according to the received printing data.

Recently, computers have come to perform the following process in a printing operation so as to increase the throughput thereof. Namely, printing data is first decomposed into color components. Subsequently, color image data respectively representing the color components are serially generated and are then transmitted to a printer.

Such a conventional printing method will be described by referring to FIG. 3 which illustrates an example thereof. When printing an image displayed on the screen 2 of, for instance, a cathode-ray tube (CRT) of a color display unit, a host computer 1 usually causes a central processing unit (CPU) 3 contained therein to perform a scanning operation on original image data representing the displayed image, which consists of RGB half-tone data stored in a memory 4, in the scanning direction thereof, namely, in the direction of a row raster (namely, from left to right on the screen 2, as viewed in this figure) and edit the color image data, and causes an edition buffer 5 to hold the edited color image data therein temporarily. This edition operation of converting the original image data consisting of the RGB half-tone data into the color image data is performed correspondingly to each of rasters, which are arranged at a pitch equal to a pitch or interval between adjacent printing elements (namely, the distance between adjoining dots) of a print head 7 of a printer 6, by converting the multivalued RGB half-tone data into the color image data consisting of binary image data respectively corresponding to three color (YMC) components or four color (YMCK) components.

The procedure of this conversion in the case of obtaining the color image data consisting of binary image data respectively corresponding to YMC components will be described hereinbelow. When a raster portion corresponding to a given dot of the print head 7 is scanned according to a command sent from the CPU 3, Y-component color image data corresponding to this raster portion is first edited from the RGB half-tone data and is then stored in the edition buffer 5 temporarily. When the Y-component color image data temporarily stored in this edition buffer 5 is transferred to one of a first memory 8 and a second memory 9 of the printer 6 (for example, the first memory 8), M-component color image data is simultaneously edited from the RGB half-tone data and subsequently, this M-component color image data is temporarily stored in the edition buffer 5, which has become empty. When the M-component color image data temporarily stored in this edition buffer 5 is transferred to the first memory 8 of the printer 6, C-component color image data is simultaneously edited from the RGB half-tone data and subsequently, this C-component color image data is temporarily stored in the edition buffer 5, which has become empty. During this process, a raster portion corresponding to the next dot is scanned. When the C-component color image data temporarily stored in the edition buffer 5 is transferred to the first memory 8 of the printer 6, Y-component color image data corresponding to the next dot is simultaneously edited from the RGB half-tone data, similarly as in the case of the preceding raster portion, and subsequently, this Y-component color image data is temporarily stored in the edition buffer 5, which has become empty. Thereafter, the edition of color image data and the transfer of the edited color image data to the printer 6 are repeatedly performed correspondingly to the rest of all raster portions, similarly as in the case of the aforementioned raster portion.

The capacity of each of the memories is set in such a manner as to be able to store printing data of one line or row, namely, YMC color image data of one line to be printed by a shift of all printing elements of the print head 7, which moves together with a carriage, in the direction of a column. Therefore, the transfer of the color image data, which has been edited as above described, to the printer 6 is performed in units of one line by alternately using the first memory 8 and the second memory 9.

When all of YMC color image data representing a first line of pixels of an image displayed on the screen 2 of the color display unit are transferred to the first memory 8, three-color (YMC) color image data representing a second line of pixels of this image is transferred to the second memory 9. Simultaneously, the first line of the image is printed according to the YMC color image data of the first line stored in the first memory 8 by repeatedly printing three color components thereof by means of the print head 7. Subsequently, color image data representing a third line of pixels of the image is transferred to the first memory 8 which has become empty. Simultaneously, the second line of the image is printed according to the color image data of the second line stored in the second memory 9. The entire image is printed by repeatedly performing this process or operation on the color image data representing the remaining lines of the image.

The reason why two memories 8 and 9 are provided in the printer 6 of a conventional system is that a multitasking operation of simultaneously performing both of the writing of color image data sent from the host computer 1 to the memories 8 and 9 and the printing of the color image data written to the memory 8 or 9 by means of the print head 7 is performed so as to realize a high-speed printing operation of the printer.

In the case that the two memories 8 and 9 are provided in the system so as to perform a multitasking operation, if the number of printing elements of the print head 7 is small, namely, equal to or less than 20, a memory having small capacity may be used as each of the memories 8 and 9. However, if the number of printing elements of the print head 7 is large, namely, equal to or more than 100, two memories, each of which has large capacity, should be needed as the memories 8 and 9. Thus, in such a case, the system has a drawback in that the manufacturing cost thereof becomes very high.

Especially, in view of the fact that recently, printers with high resolution of, for instance, 600 dots per inch (dpi) have become used and thus memories having further larger capacity have become needed as the memories 8 and 9, such a drawback has becomes serious.

SUMMARY OF THE INVENTION

Accordingly, an object of the present invention is to provide a color-image-data control method, by which the capacity of the memories of the printer can be reduced by half in comparison with that of the memories of the conventional printer and a high-speed printing operation of the printer can be realized by performing a multitasking operation and thus the cost can be reduced and moreover, the printing performance of the entire system can be enhanced.

Further, another object of the present invention is to provide a color-image data control method for storing color image data inputted from an external device, such as a computer, in a memory provided in a printer, for reading the color image data stored in this memory and for printing the read color image data by means of the print head, wherein the color image data is data obtained by performing a raster scan on each color component of the color image data according to the arrangement of the printing elements of the print head, wherein the memories provided in the printer have capacity sufficient to store all color components of color image data to be printed by means of all printing elements of the print head, wherein image data corresponding to each color component is read from the memory provided in the printer as a unit to be printed by all of the printing elements of the print head and is used to print one of the color components of an image, wherein color image data respectively sent from the external device are serially stored in spaces of the memory provided in the printer color, which have been released by reading the image data respectively corresponding to color components.

To achieve the foregoing objects, in accordance with the present invention, there is provided a color-image-data control method, by which both of an operation of reading and printing color image data stored in a memory and an operation of storing color image data in the memory can be performed simultaneously by using the memory whose capacity is sufficient to store color image data of all color components to be printed by all of the printing elements of the print head, thereby reducing the capacity of the memory by half in comparison with that of the memories of the system employing a conventional method, and by which a high-speed printing can be realized by performing a multitasking operation.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a preferred embodiment of the present invention will be described in detail by referring to FIGS. 1 and 2.

Figure 1:
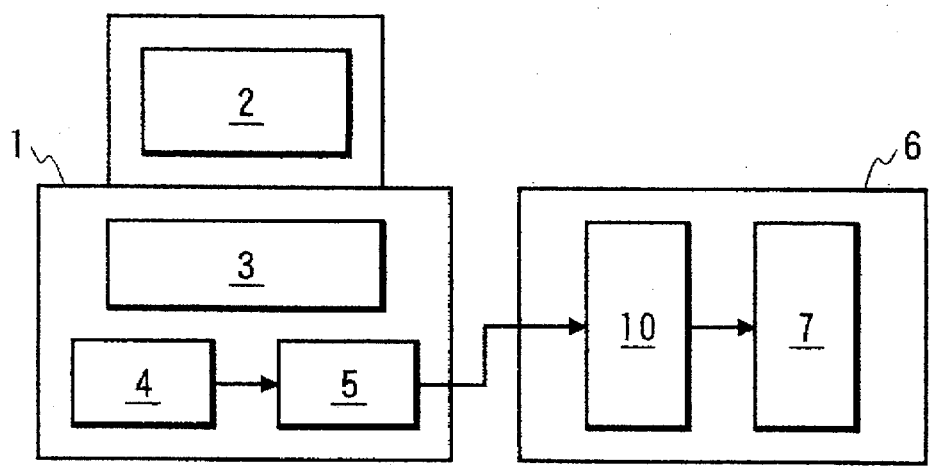
FIG. 1 is a block diagram for illustrating the configuration of a printing system to be used for performing a color-image-data control method of the present invention.

FIG. 1 illustrates the configuration of a printing system to be used for performing a color-image-data control method of the present invention. Further, FIG. 2 illustrates a flow of color image data in the case of performing an embodiment of the color-image-data control method of the present invention.

Figure 3:
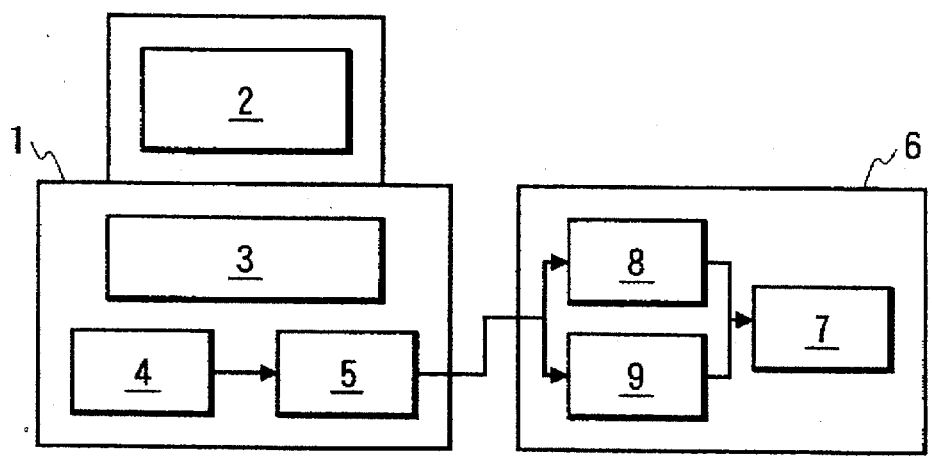
FIG. 3 is a block diagram for illustrating the configuration of a printing system to be used for performing the conventional color-image-data control method.

As shown in FIG. 1, the printing system used for performing the method of the present invention is provided with a memory 10, which has memory capacity sufficient to store color image data respectively corresponding to all color components of an image to be printed by use of all printing elements of a print head 7, instead of the first memory 8 and the second memory 9 of the printer 6 of the conventional system of FIG. 3. The other composing elements of the printing system of FIG. 1 are similar to the corresponding composing elements of the system of FIG. 3.

Hereunder, a printing operation to be performed according to the color-image-data control method of the present invention by using the printing system of FIG. 1 will be described.

First, the edition of color image data by means of a host computer 1 and the transfer of the color image data to the memory 10 of the printer 6 are performed similarly as in the conventional system.

Namely, when printing an image displayed on the screen 2 of a color display unit, the host computer 1 causes a CPU 3 contained therein to scan original image data representing the displayed image in the scanning direction, namely, the direction of a row raster on the screen 2 (namely, from left to right thereon, as viewed in this figure) and to temporarily store the color image data in an edition buffer 5. The edition of the original image data consisting of RGB half-tone data into color image data is performed correspondingly to each of rasters, which are arranged at a pitch equal to a pitch or interval between adjacent ones of n printing elements (namely, the distance between adjoining dots) of the print head 7 of the printer 6, by converting the multivalued RGB half-tone data into the color image data consisting of three-color (YMC) or four-color (YMCK) binary image data obtained by decomposing the color image data thereinto.

The procedure of this conversion in the case of obtaining the color image data consisting of the binary image data respectively corresponding to three-color (YMC) components will be described hereinbelow. When a raster portion corresponding to a given dot of the print head 7 is scanned, Y-component color image data corresponding to this raster portion is first edited from the RGB half-tone data and is then stored in the edition buffer 5 temporarily. When the Y-component color image data temporarily stored in this edition buffer 5 is transferred to the memory 10 of the printer 6, M-component color image data is simultaneously edited from the RGB half-tone data and subsequently, this M-component color image data is temporarily stored in the edition buffer 5, which has become empty. When the M-component color image data temporarily stored in this edition buffer 5 is transferred to the memory 10 of the printer 6, C-component color image data is simultaneously edited from the RGB half-tone data and subsequently, this C-component color image data is temporarily stored in the edition buffer 5, which has become empty. During this process, a raster portion corresponding to the next dot is scanned. When the C-component color image data temporarily stored in the edition buffer 5 is transferred to the memory 10 of the printer 6, Y-component color image data corresponding to the next dot is simultaneously edited from the RGB half-tone data, similarly as in the case of the preceding raster portion, and subsequently, this Y-component color image data is temporarily stored in the edition buffer 5, which has become empty. Thereafter, the edition of color image data and the transfer of the edited color image data to the printer 6 are repeatedly performed correspondingly to the rest of all raster portions, similarly as in the case of the process described just hereinabove.

The printing of the color image data transferred to and stored in the memory 10 of the printer 6, the transfer of the next color image data to the memory 10 and the storage of this color image data in the memory 10 are performed as follows.

Figure 2:
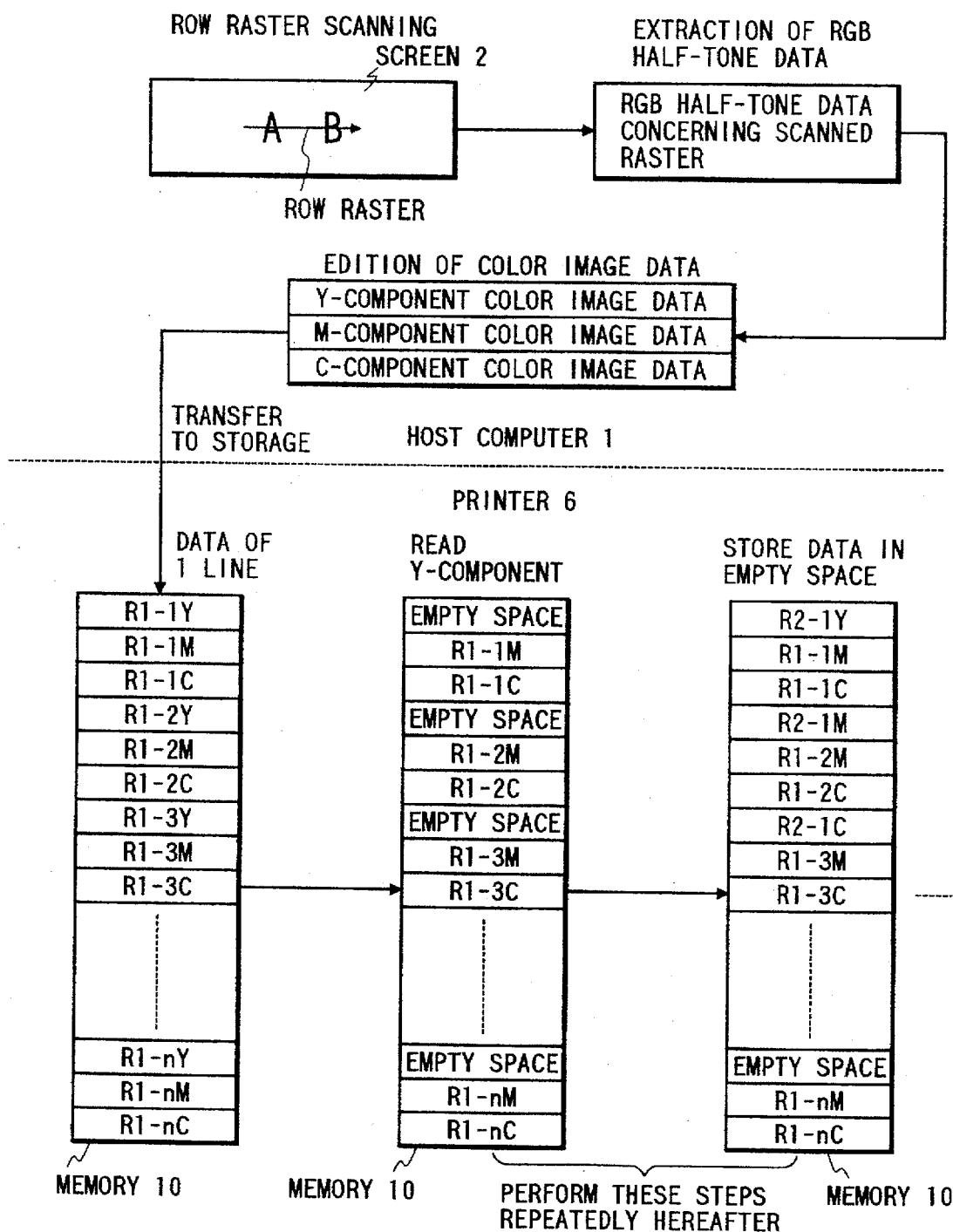
FIG. 2 is a diagram for illustrating a flow of color image data in the case of performing an embodiment of the color-image-data control method of the present invention.

As illustrated in FIG. 2, all of three-color (YMC) image data (R1-1Y, R1-1M, R1-1C, R1-2Y, R1-2M, R1-2C, R1-3Y, R1-3M, R1-3C, . . . R1-nY, R1-nM, R1-nC) respectively representing pixels of a first line of the image displayed on the screen 2 of the color display are transferred to the memory 10 and subsequently, are stored therein. At that time, the memory 10 is put into a state in which the memory 10 is filled with the color image data to the fullest capacity thereof. Here, the left-side part "R1" of each of the reference characters means "the first line" of the image. Further, the right-side parts "-1, -2" and so on of the reference characters mean "a first raster, a second raster" and so forth of the first line, respectively.

Next, the Y-component color image data (R1-1Y, R1-2Y, R1-3Y, . . . R1-nY) are selected and read from the color image data (R1-1Y, R1-1M, R1-1C, R1-2Y, R1-2M, R1-2C, R1-3Y, R1-3M, R1-3C, . . . R1-nY, R1-nM, R1-nC) stored in the memory 10 as a unit to be printed, and are then used to print the Y-component of the first line of the image. Further, the three-color (YMC) image data (R2-1Y, R2-1M, R2-1C, R2-2Y, R2-2M, R2-2C, R2-3Y, R2-3M, R2-3C, . . . R2-nY, R2-nM, R2-nC) representing a second line of the image are serially stored from the leading data in empty spaces of the memory 10, which have been released by reading the Y-component color image data (R1-1Y, R1-2Y, R1-3Y, . . . R1-nY) therefrom. Practically, one-third of a leading portion of all of the color image data (R2-1Y, R2-1M, R2-1C, R2-2Y, R2-2M, R2-2C, R2-3Y, R2-3M, R2-3C, . . . R2-nY, R2-nM, R2-nC) are stored in the empty spaces of the memory 10, which have been released by reading the Y-component color image data (R1-1Y, R1-2Y, R1-3Y, . . . R1-nY) therefrom.

Next, the M-component color image data (R1-1M, R1-2M, R1-3M, . . . R1-nM) corresponding the first line are read from the memory 10 as a unit to be printed, and are then used to print the M-component of the first line of the image. Further, one-third of a middle portion of all of the color image data (R2-1Y, R2-1M, R2-1C, R2-2Y, R2-2M, R2-2C, R2-3Y, R2-3M, R2-3C, . . . R2-nY, R2-nM, R2-nC) representing the second line of the image are serially stored in empty spaces of the memory 10, which have been released by reading the M-component color image data (R1-1M, R1-2M, R1-3M, . . . R1-nM) therefrom.

Next, the C-component color image data (R1-1C, R1-2C, R1-3C, . . . R1-nC) corresponding the first line are read from the memory 10 as a unit to be printed, and are then used to print the C-component of the first line of the image. Further, one-third of a trailing portion of all of the color image data (R2-1Y, R2-1M, R2-1C, R2-2Y, R2-2M, R2-2C, R2-3Y, R2-3M, R2-3C, . . . R2-nY, R2-nM, R2-nC) representing the second line of the image are serially stored in empty spaces of the memory 10, which have been released by reading the C-component color image data (R1-1C, R1-2C, R1-3C, . . . R1-nC) therefrom.

Thus, the color printing of the first line is finished. Subsequently, the printing of the second line and the storage of color image data (R3-1Y, R3-1M, R3-1C, R3-2Y, R3-2M, R3-2C, R3-3Y, R3-3M, R3-3C, . . . R3-nY, R3-nM, R3-nC) representing a third line of the image are performed similarly as in the aforementioned case. The color printing of the entire image is performed by repeatedly performing this process on the color image data representing the third line and the rest of the image.

Therefore, in the case of this embodiment of the present invention, both of an operation of reading and printing color image data stored in a memory and an operation of storing color image data in the memory can be performed simultaneously by using the memory 10 whose capacity is sufficient to store color image data of all color components to be printed by all of the printing elements of the print head, thereby reducing the capacity of the memory by half in comparison with that of the memories of the system employing a conventional method, and by which a high-speed printing can be realized by performing a multitasking operation.

Incidentally, in the foregoing description of this embodiment of the present invention, it is assumed that locations, at which color image data are stored, in the memory 10 are fixedly predetermined. Needless to say, the locations, at which color image data are stored, in the memory 10 may be established randomly.

Moreover, if necessary, known methods may be selected and employed instead of the method or process for editing the color image data in the host computer 1, namely, the method for performing a scanning operation on original image data representing the displayed image, which consists of RGB half-tone data stored in the memory 4, in the scanning direction thereof, namely, in the direction of a row raster on the screen 2 and editing the color image data and causing the edition buffer 5 to hold the edited color image data therein temporarily, and the method for transferring the color image data to the memory 10 of the printer 6.

The color-image-data control method of the present invention is devised as above described and has the aforesaid advantages. Namely, the capacity of the memory can be reduced by half in comparison with that of the memories of the system employing a conventional method, and a high-speed printing can be realized by performing a multitasking operation. Consequently, the cost of the system employing the control method of the present invention can be decreased and the printing performance of the entire system can be enhanced.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A method for controlling a color printer to print a color image corresponding to color image data transmitted from an external device, comprising the steps of:

storing color image data for a first row of the color image in a storage device such that data associated with a first color component of the color image data is stored in a first plurality of storage spaces of the storage device, data associated with a second color component of the color image data is stored in a second plurality of storage spaces of the storage device, and data associated with a third color component of the color image data is stored in a third plurality of storage spaces of the storage device;

simultaneously transmitting the data associated with the first color component of the first row from the first plurality of storage spaces to a print head of the color printer while storing color image data for one-third of a second row of the color image in the storage device such that data associated with the first color component, the second color component and the third color component of the color image data associated with said one-third of the second row of the color image is stored in the first plurality of storage spaces;

simultaneously transmitting the data associated with the second color component from the second plurality of storage spaces of the storage device to the print head while storing color image data for a second one-third of the second row in the second plurality of storage spaces;

simultaneously transmitting the data associated with the third color component from the third plurality of storage spaces to the print head while storing color image data for a third one-third of the second row in the third plurality of storage spaces; and simultaneously transmitting the data associated with the first color component of the second row from a fourth plurality of storage spaces of the storage device to the print head while storing color image data for a first one-third of a third row of the color image in the storage device such that data associated with the first color component, the second color component and the third color component of the color image data associated with said first one-third of the third row of the color image is stored in the fourth plurality of storage spaces, wherein the fourth plurality of storage spaces includes selected storage spaces of the first, second and third pluralities of storage spaces.

2. A method for transferring color-image data from a first device to a color printer and for printing a color image using a print head of the color printer and the color-image data, comprising the steps of:

scanning a color image to obtain color-image data for each of a first plurality of dots making up a first portion of the color image, and for each of a second plurality of dots making up a second portion of the color image, the color-image data including data for a plurality of color components of the color image data, the first and second pluralities of dots being arranged in correspondence with an arrangement of printing elements of the print head;

storing the color-image data for the first portion of the color image in a storage device of the color printer such that data associated with a first color component of the color-image data is stored in a first plurality of storage spaces of the storage device, data associated with a second color component of the color-image data is stored in a second plurality of storage spaces of the storage device, and data associated with a third color component of the color-image data is stored in a third plurality of storage spaces of the storage device; and transferring the color-image data for the first color component of the first portion from the first plurality of storage spaces to the print head while storing a fraction of the color-image data for the second portion of the color image in the storage device such that data associated with the first color component, the second color component and the third color component of the color image data associated with said fraction of the second portion of the color image is stored in the first plurality of storage spaces.

3. The method according to claim 2, further comprising the steps of:

transferring the color-image data for the second color component of the first portion from the second plurality of storage spaces to the print head while transferring a second fraction of the color-image data for the second portion of the color image to the second plurality of storage spaces of the storage device; and transferring a third fraction of the color-image data for the second portion of the color image to the second plurality of storage spaces of the storage device while transferring a third fraction of the color-image data for the second portion of the color image to the third plurality of storage spaces of the storage device.

* * * * *